US011308257B1

(12) United States Patent
Chidambarrao et al.

(10) Patent No.: US 11,308,257 B1
(45) Date of Patent: Apr. 19, 2022

(54) STACKED VIA RIVETS IN CHIP HOTSPOTS

(71) Applicant: International Business Machines Corporation, Armonk, NY (US)

(72) Inventors: Dureseti Chidambarrao, Weston, CT (US); David Wolpert, Poughkeepsie, NY (US); Atsushi Ogino, Fishkill, NY (US); Matthew T. Guzowski, Essex Junction, VT (US); Steven Paul Ostrander, Poughkeepsie, NY (US); Tuhin Sinha, Oradell, NJ (US); Michael Stewart Gray, Fairfax, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/122,550

(22) Filed: Dec. 15, 2020

(51) Int. Cl.
*G06F 30/30* (2020.01)
*G06F 30/398* (2020.01)
*G06F 30/392* (2020.01)
*H01L 23/48* (2006.01)
*G06F 119/14* (2020.01)

(52) U.S. Cl.
CPC .......... *G06F 30/398* (2020.01); *G06F 30/392* (2020.01); *H01L 23/481* (2013.01); *G06F 2119/14* (2020.01)

(58) Field of Classification Search
CPC .. G06F 30/398; G06F 30/392; G06F 2119/14; H01L 23/481
USPC ........................................................ 716/112
See application file for complete search history.

(56) References Cited

U.S. PATENT DOCUMENTS

| 6,586,839 | B2 | 7/2003 | Chisholm et al. |
| 7,180,187 | B2 | 2/2007 | Fitzsimmons et al. |
| 7,224,069 | B2 | 5/2007 | Chen |
| 7,312,530 | B2 | 12/2007 | Hashimoto et al. |
| 7,521,336 | B2 | 4/2009 | Daubenspeck et al. |

(Continued)

FOREIGN PATENT DOCUMENTS

| CN | 105279306 A | 1/2016 |
| CN | 107112348 A | 8/2017 |

(Continued)

OTHER PUBLICATIONS

International Search Report dated Jan. 28, 2022 issued in PCT/CN2021/128169, 9 pages.

*Primary Examiner* — Jack Chiang
*Assistant Examiner* — Brandon Bowers
(74) *Attorney, Agent, or Firm* — Scully, Scott, Murphy & Presser, P.C.; L. Jeffrey Kelly

(57) ABSTRACT

A structure including a plurality of dielectric regions is described. The structure can include a rivet cell. The rivet cell can include a set of stacked vias. The rivet cell can extend through a stress hotspot of the structure. A length of the rivet cell can thread through at least one dielectric region among the plurality of dielectric regions. The rivet cell can be among a number of rivet cells inserted in the stress hotspot. The stress hotspot can be among a plurality of stress hotspots across the structure. A length of the rivet cell can be based on a model of a relationship between the length of the rivet cell and an energy release rate of the structure. The rivet cell can thread through an interface between a first dielectric region and a second dielectric region having different dielectric constants.

17 Claims, 9 Drawing Sheets

(56) References Cited

U.S. PATENT DOCUMENTS

| | | |
|---|---|---|
| 7,572,738 B2 | 8/2009 | Nogami |
| 7,955,955 B2 | 6/2011 | Lane et al. |
| 8,089,162 B2 | 1/2012 | Watanabe |
| 8,350,385 B2 | 1/2013 | Hochstenbach |
| 8,368,220 B2 | 2/2013 | Lu et al. |
| 8,710,629 B2 | 4/2014 | Bai et al. |
| 8,802,559 B2 | 8/2014 | Yang et al. |
| 8,860,185 B2 | 10/2014 | Yuan et al. |
| 8,921,982 B2 | 12/2014 | Tomita |
| 8,941,215 B2 | 1/2015 | Hu et al. |
| 8,970,049 B2 | 3/2015 | Karnezos |
| 9,236,301 B2 | 1/2016 | Ning et al. |
| 9,245,826 B2 | 1/2016 | Jebory et al. |
| 9,343,411 B2 | 5/2016 | Jezewski et al. |
| 9,355,936 B2 | 5/2016 | Cooney, III et al. |
| 9,424,384 B2 | 8/2016 | Yang et al. |
| 9,466,579 B2 | 10/2016 | Hochstenbach et al. |
| 10,193,211 B2 | 1/2019 | Finn et al. |
| 2005/0118803 A1 | 6/2005 | Hichri et al. |
| 2006/0228825 A1* | 10/2006 | Hembree ............ H01L 25/0657 438/51 |
| 2007/0204243 A1 | 8/2007 | Ito et al. |
| 2008/0066023 A1 | 3/2008 | Xu et al. |
| 2009/0312960 A1 | 12/2009 | Dang et al. |
| 2010/0038120 A1 | 2/2010 | Kojima et al. |
| 2012/0104604 A1 | 5/2012 | McCarthy et al. |
| 2013/0214234 A1 | 8/2013 | Gopalan et al. |
| 2013/0292793 A1 | 11/2013 | Poucher et al. |
| 2016/0329280 A1 | 11/2016 | Ma et al. |
| 2017/0025497 A1 | 1/2017 | Poucher et al. |
| 2017/0162501 A1 | 6/2017 | Yi et al. |
| 2018/0286699 A1 | 10/2018 | Lin et al. |
| 2020/0221969 A1 | 7/2020 | Ram et al. |
| 2021/0098376 A1* | 4/2021 | Lin .................... H01L 21/31116 |
| 2021/0327852 A1* | 10/2021 | Teng ..................... H01L 23/481 |

FOREIGN PATENT DOCUMENTS

| | | |
|---|---|---|
| CN | 108292710 A | 7/2018 |
| CN | 110943035 A | 3/2020 |
| CN | 111052600 A | 4/2020 |
| EP | 1351229 B1 | 2/2005 |
| EP | 1316112 B1 | 2/2007 |
| EP | 3317114 A1 | 5/2018 |
| EP | 3479662 A1 | 5/2019 |
| KR | 20070088258 A | 8/2007 |
| KR | 20080044276 A | 5/2008 |
| KR | 20100020917 A | 2/2010 |
| KR | 101076537 B1 | 10/2011 |
| KR | 101076643 B1 | 10/2011 |
| KR | 20140015360 A | 2/2014 |
| KR | 20150087412 A | 7/2015 |
| KR | 20180033468 A | 4/2018 |
| KR | 20190002273 A | 1/2019 |
| KR | 20200001544 A | 1/2020 |
| KR | 102082445 B1 | 2/2020 |
| TW | 200532723 A | 10/2005 |
| WO | 20170005633 A1 | 1/2017 |
| WO | 20180002230 A1 | 1/2018 |
| WO | 2019230252 A1 | 5/2019 |

\* cited by examiner

STACKED VIA RIVETS IN CHIP HOTSPOTS

BACKGROUND

The present application relates to a structure including a partial stack of vias that threads through one or more dielectric layers of the structure.

Semiconductor devices can include structures (e.g., back-end-of-line (BEOL) structures) that include a plurality of dielectric regions or layers having different values of dielectric constant, k. Interfaces between dielectric layers of different k can crack or delaminate due to various factors that drive the crack propagation. The driving forces include factors such as differing thermal expansion (or contraction) between the various materials in the package and chip structures, residual stresses in the materials, etc. Besides the chip and package driving forces some of the thermal expansion mismatch can occur between the metal and dielectrics in the BEOL structures of the chip. Operations of a semiconductor device with a crack or delamination at the interfaces can be vulnerable to failures. In some examples, the cracks can cause opens between the different BEOL levels (e.g., in between one of the metal lines and the vias) and render the whole chip inoperable. In some examples, the cracks can also increase a resistance of current paths formed in the BEOL structure, and the increased resistance can generate unwanted heat within the semiconductor device.

Some conventional solutions to address the cracking or delamination can include, for example, minimizing stress by modulating the coefficient of thermal expansion (CTE) mismatch between the materials or changing the residual stress in materials by changing the deposition conditions, etc. Other process techniques include improving the interfacial properties between the various materials so that their propensity to crack is reduced. However, the stress within the structure may not be completely eliminated such that the potential of propagating the crack may still exist. Other conventional solutions can include, for example, minimizing the number of via-to-via interfaces in the structure to decrease chances of cracking and/or delamination. However, the potential of cracks still exists. Another conventional solution can include, for example, inserting bond pads or connectors between dielectric regions or layers, but the location to insert these bond pads, connectors, are not specified.

SUMMARY

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can be a first rivet cell located at a first lateral distance from a first corner of the structure. The structure can further include a second rivet cell located at a second lateral distance from a second corner of the structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can be among a number of rivet cells inserted in the stress hotspot, and the number of rivet cells can be based on a size of the stress hotspot.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The stress hotspot can be among a plurality of stress hotspots across the structure, and each stress hotspot can include a respective set of rivet cells.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The length of the rivet cell can be based on a model of a relationship between the length of the rivet cell and an energy release rate of the structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The structure can be a back-end-of-line (BEOL) structure of a semiconductor device.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can thread through an interface between a first dielectric region and a second dielectric region among the plurality of dielectric regions. The first dielectric region and the second dielectric region can have different dielectric constants.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can thread through an interface between a first dielectric region and a second dielectric region among the plurality of dielectric regions. The first dielectric region and the second dielectric region can have different dielectric constants. The first dielectric region can include hard dielectric materials and the second dielectric region can include soft dielectric materials.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell data can further indicate multiple insertion locations of multiple rivet cells, the multiple insertion locations being within the stress hotspot.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The modeling of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The projected anomaly can be a crack at the interface between the first dielectric region and the second dielectric region.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The first dielectric region and the second dielectric region can have different values of dielectric constant.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The stress hotspot can be among a plurality of stress hotspots across the structure, and each stress hotspot can include a respective set of rivet cells.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell can be among a number of rivet cells inserted in the stress hotspot, and the number of rivet cells can be based on a size of the stress hotspot.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The identification of the optimal length of the rivet cell can include identifying a length of the rivet cell that results in a lowest energy release rate.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The method can further include generating a three-dimensional (3D) model of the structure. The method can further include executing an instruction to perform stress analysis on the 3D model. The method can further include identifying the location of the stress hotspot from an output of the stress analysis.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The model of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The model of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly. The projected anomaly can be a crack at the interface between the first dielectric region and the second dielectric region.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The model of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly. The first dielectric region and the second dielectric region has different values of dielectric constant.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell can be among a number of rivet cells inserted in the stress hotspot, and the number of rivet cells can be based on a size of the stress hotspot.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The stress hotspot can be among a plurality of stress hotspots across the structure, and each stress hotspot can include a respective set of rivet cells.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The program instructions can be executable by the processing element of the device to cause the device to identify a length of the rivet cell that results in a lowest energy release rate to identify the optimal length of the rivet cell.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The program instructions can be executable by the processing element of the device to generate a three-dimensional (3D) model of the structure. The program instructions can be executable by the processing element of the device to execute an instruction to perform stress analysis on the 3D model. The program instructions can be executable by the processing element of the device to identify the location of the stress hotspot from an output of the stress analysis.

DETAILED DESCRIPTION

Figure 1A:
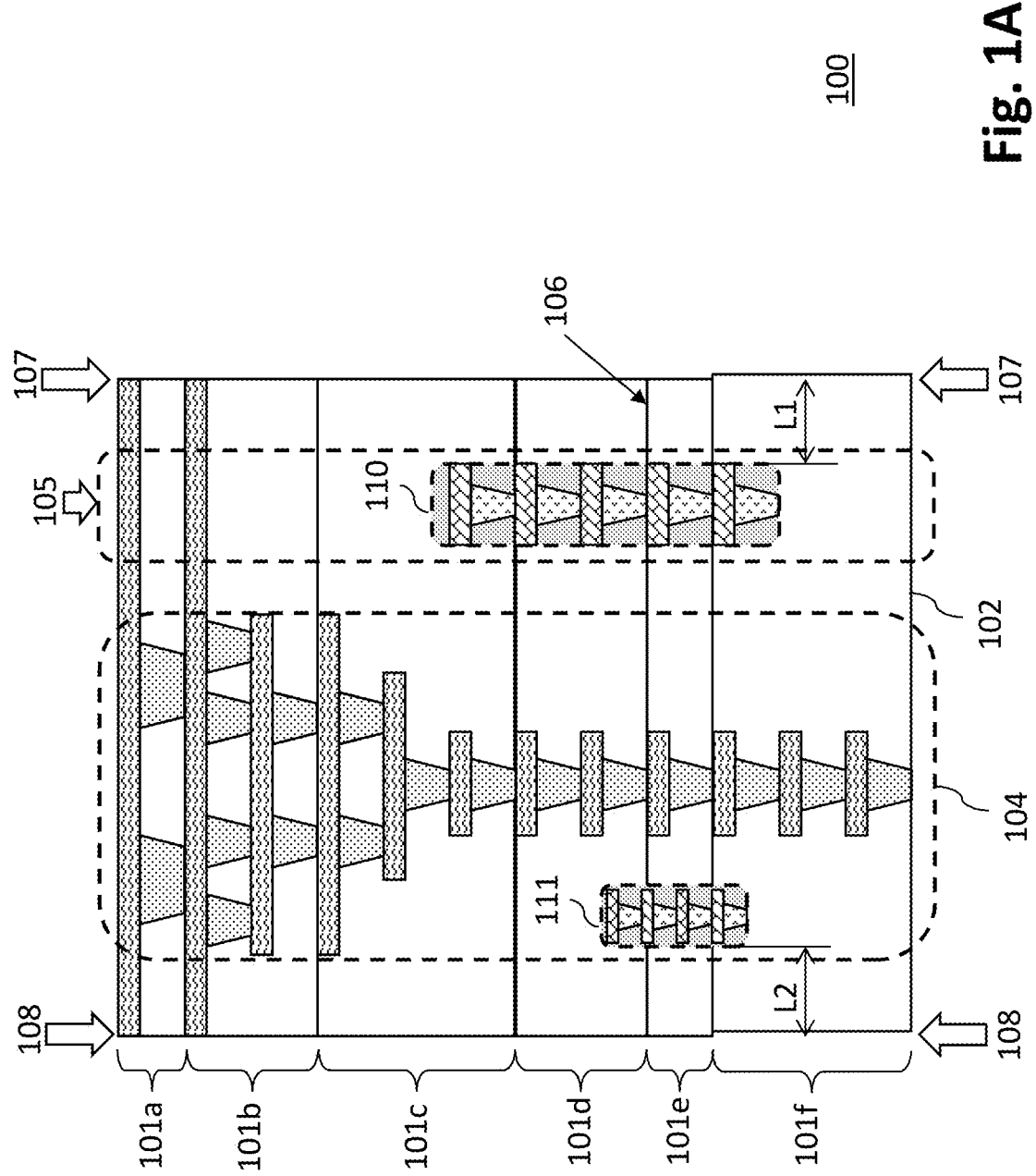
FIG. 1A is a cross sectional view of an exemplary structure including a rivet cell, in one embodiment.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

To be described in more detail below, the structure described herein includes one or more specially designed partial stack via sets situated in hotspot regions. Further, the methods and systems described herein can identify regions and precise locations of the partial stack vias sets by using various modeling techniques along with how many of these multiple partial via sets can be placed. The partial stack via sets can be referred to as "rivet cells", where they can rivet through soft dielectrics specifically and can be intended to serve as anchors for multiple dielectric layers. Further, the rivet cells need not to be restricted to touch bond pads as they can be inside the metal stack and extend through multiple metal levels below the bond pad or C4 structures. Furthermore, multiple rivet cells can be used in various regions of a chip and may not need to be treated as a network and may not need to extend to the bond pads or the device contacts. Stress hotspot regions near corners of the chip can be modeled such that the rivet cells can be inserted at the hotspot regions to provide support before cracks appear. Also, the size of the rivet cells are determined based on models of relationships between the size of the rivet cells and the potential reaction of the structure in response to environmental changes (e.g., thermal expansion or contraction in response to temperature change, stress, forces, etc.).

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell in the structure can prevent propagation of a crack that can be present at an interface between a pair of dielectric regions among the at least one dielectric region.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can be a first rivet cell located at a first lateral distance from a first corner of the structure. The structure can further include a second rivet cell located at a second lateral distance from a second corner of the structure. The first and second rivet cells in the structure can prevent propagation of cracks that can be present across multiple stress hotspots of the structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can be among a number of rivet cells inserted in the stress hotspot, and the number of rivet cells can be based on a size of the stress hotspot. The number of rivet cells in the stress hotspot can prevent propagation of cracks that can be present in the stress hotspot, and/or across multiple stress hotspots, of the structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The stress hotspot can be among a plurality of stress hotspots across the structure, and each stress hotspot can include a respective set of rivet cells. The rivet cell in the structure can prevent propagation of cracks that can be present across multiple stress hotspots of the structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The length of the rivet cell can be based on a model of a relationship between the length of the rivet cell and an energy release rate of the structure. The model of the relationship can provide an optimal size of the rivet cell and an optimal location of the rivet cell in the structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The structure can be a back-end-of-line (BEOL) structure of a semiconductor device. The rivet cell in the structure can prevent propagation of a crack that can be present in the BEOL structure.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can thread through an interface between a first dielectric region and a second dielectric region among the plurality of dielectric regions. The first dielectric region and the second dielectric region can have different dielectric constants. The rivet cell in the structure can prevent propagation of a crack that can be present at an interface between the first dielectric region and the second dielectric region.

In some examples, a structure including a rivet cell is generally described. The structure can include a plurality of dielectric regions. The rivet cell can include a set of stacked vias. The rivet cell can extend through a stress hotspot of the structure. A length of the rivet cell can thread through at least one dielectric region among the plurality of dielectric regions. The rivet cell can thread through an interface between a first dielectric region and a second dielectric region among the plurality of dielectric regions. The first dielectric region and the second dielectric region can have different dielectric constants. The first dielectric region can include hard dielectric materials and the second dielectric region can include soft dielectric materials. The rivet cell in the structure can prevent propagation of a crack that can be present at an interface between the hard dielectric region and the soft dielectric region.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The insertion of the rivet cell in the structure can prevent propagation of a crack that can be present at an interface between a pair of dielectric regions among the at least one dielectric region.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell data can further indicate multiple insertion locations of multiple rivet cells, the multiple insertion locations being within the stress hotspot. The rivet cells being in the multiple insertion locations can prevent propagation of cracks that can be present across multiple stress hotspots of the structure.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The modeling of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly. The model of the relationship can provide an optimal size of the rivet cell and an optimal location of the rivet cell in the structure.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The projected anomaly is a crack at the interface between the first dielectric region and the second dielectric region. The rivet cell in the structure can prevent propagation of the crack or delamination.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The first dielectric region and the second dielectric region can have different values of dielectric constant. The rivet cell in the structure can prevent propagation of a crack that can be present at an interface between the first dielectric region and the second dielectric region.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The stress hotspot can be among a plurality of stress hotspots across the structure, and each stress hotspot can include a respective set of rivet cells. The rivet cell in the structure can prevent propagation of cracks that can be present across multiple stress hotspots of the structure.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell can be among a number of rivet cells inserted in the stress hotspot, and the number of rivet cells can be based on a size of the stress hotspot. The number of rivet cells in the stress hotspot can prevent propagation of cracks that can be present in the stress hotspot, and/or across multiple stress hotspots, of the structure.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The identification of the optimal length of the rivet cell can include identifying a length of the rivet cell that results in a lowest energy release rate. The model of the relationship can provide an optimal size of the rivet cell and an optimal location of the rivet cell in the structure.

In some examples, a method for determining a location of a rivet cell in a structure is generally described. The method can include modeling a location of a stress hotspot in a structure. The method can further include modeling a relationship between a length of a rivet cell and an energy release rate of the structure. The method can further include identifying an optimal length of the rivet cell based on the modeled relationship. The method can further include generating rivet cell data that indicates an insertion location of the rivet cell. The insertion location can be based on the location of the stress hotspot. The method can further include sending the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The method can further include generating a three-dimensional (3D) model of the structure. The method can further include executing an instruction to perform stress analysis on the 3D model. The method can further include identifying the location of the stress hotspot from an output of the stress analysis. The stress analysis can provide the location of the stress hotspot that can be used to identify an optimal location of the rivet cell in the structure.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell in the structure can prevent propagation of a crack that can be present at an interface between the first dielectric region and the second dielectric region.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure, and can thread through at least one dielectric region among a plurality of dielectric regions of the structure. The model of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly. The model of the relationship can provide an optimal size of the rivet cell and an optimal location of the rivet cell in the structure.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure, and can thread through at least one dielectric region among a plurality of dielectric regions of the structure. The model of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly. The projected anomaly can be a crack at the interface between the first dielectric region and the second dielectric region. The rivet cell in the structure can prevent propagation of the crack or delamination.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure, and can thread through at least one dielectric region among a plurality of dielectric regions of the structure. The model of the relationship can be performed based on a projection of an anomaly at the location of the stress hotspot and on an interface between a first dielectric region and a second dielectric region among the plurality of dielectric regions. Upon the insertion of the rivet cell, the rivet cell can thread through at least a portion the first dielectric region and at least a portion of the second dielectric region. The energy release rate of the structure can be based on the location of the projected anomaly. The first dielectric region and the second dielectric region has different values of dielectric constant. The rivet cell in the structure can prevent propagation of a crack that can be present at an interface between the first dielectric region and the second dielectric region.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The rivet cell can be among a number of rivet cells inserted in the stress hotspot, and the number of rivet cells can be based on a size of the stress hotspot. The number of rivet cells in the stress hotspot can prevent propagation of cracks that can be present in the stress hotspot, and/or across multiple stress hotspots, of the structure.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The stress hotspot can be among a plurality of stress hotspots across the structure, and each stress hotspot can include a respective set of rivet cells. The rivet cell in the structure can prevent propagation of cracks that can be present across multiple stress hotspots of the structure.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The program instructions can be executable by the processing element of the device to cause the device to identify a length of the rivet cell that results in a lowest energy release rate to identify the optimal length of the rivet cell. The model of the relationship can provide an optimal size of the rivet cell and an optimal location of the rivet cell in the structure.

In some examples, a computer program product for determining a location of a rivet cell in a structure is generally described. The computer program product can include a computer readable storage medium having program instructions embodied therewith. The program instructions can be executable by a processing element of a device to cause the device to model a location of a stress hotspot in a structure. The program instructions can be executable by a processing element of a device to cause the device to model a relationship between a length of a rivet cell and an energy release rate of the structure. The program instructions can be executable by a processing element of a device to cause the device to identify an optimal length of the rivet cell based on the modeled relationship. The program instructions can be executable by a processing element of a device to cause the device to generate rivet cell data that indicates an insertion location of the rivet cell. The insertion location can be based on the location of the stress hotspot. The program instructions can be executable by a processing element of a device to cause the device to send the rivet cell data to a device to instruct the device to construct the structure in accordance with the rivet cell data. The structure can be constructed to include the rivet cell at the insertion location. The rivet cell can extend through the stress hotspot of the structure and can thread through at least one dielectric region among a plurality of dielectric regions of the structure. The program instructions can be executable by the processing element of the device to generate a three-dimensional (3D) model of the structure. The program instructions can be executable by the processing element of the device to execute an instruction to perform stress analysis on the 3D model. The program instructions can be executable by the processing element of the device to identify the location of the stress hotspot from an output of the stress analysis. The stress analysis can provide the location of the stress hotspot that can be used to identify an optimal location of the rivet cell in the structure.

FIG. 1A is a cross sectional view of an exemplary structure including a rivet cell, in one embodiment. A structure 102 shown in FIG. 1A can be, for example, a section of a back-end-of-line (BEOL) structure for a semiconductor device 100. The semiconductor device 100 can include additional layers or sections of structures, such as a middle-of-the line (MOL) structure and a front-end-of-line (FEOL) structure: the MOL and FEOL structures are not shown in the drawings of the present application. The structure 102 can include a plurality of dielectric regions 101a to 101f having different values of k and at least one soft dielectric material 101d that is sandwiched between two hard dielectric materials 101e, 101c. The soft dielectric is an ultra low k (ULK) material that has a dielectric constant ranging from about 1.5 to about 3.5, or between about 2.0 and about 2.5. Exemplary ULK dielectrics can include porous inorganic materials such as, for example, silicon-containing materials such as compositions of Si, C, O, and H, including (SiCOH), also called C doped oxide (CDO) or organosilicate glass (OSG). Other low K materials could also include SilK (trademark of the Dow company) which is a low k organic polymer. Non-porous ULK materials can also be used in the present application. Hard dielectrics can have a dielectric constant greater than the dielectric constant of ULK materials. Examples of hard dielectrics can include, for example, silicon dioxide, silsesquioxanes, C doped oxides (i.e., organosilicates) that includes atoms of Si, C, O and H, thermosetting polyarylene ethers, or multilayers thereof. The term "polyarylene" is used in this application to denote aryl moieties or inertly substituted aryl moieties which are linked together by bonds, fused rings, or inert linking groups such as, for example, oxygen, sulfur, sulfone, sulfoxide, carbonyl and the like.

The structure 102 can include one or more sets of stacked vias and metals 104 that can be used as a conductive path spanning between dielectric regions 101a to 101f. The six dielectric regions (101a-101f) shown in this figure is just an example. There can be more or less such dielectric regions with differing dielectric thicknesses with different dielectric constants. The structure 102 can further include at least one rivet cell, such as a rivet cell 110, where the rivet cell 110 can include a set of stacked vias and metals that threads through one or more layers of dielectric regions of the structure 102. The rivet cells are not necessarily active and do not have to form a conductive path for the circuit or chip operability. The rivet cell 110 can be positioned in the structure 102 to attempt prevention of cracking or delaminating at interfaces of the dielectric regions of the structure 102. For example, the rivet cell 110 shown in FIG. 1A can be positioned to prevent a crack that can potentially occur at an interface 106 between the dielectric region 101d and 101e. In an example, the location of the rivet cell 110 in the structure 102 can be estimated based on 1) an estimation of one or more hotspot regions, such as a stress hotspot 105 (or "hotspot 105") detected on the semiconductor device 100, and 2) a model that relates a length (e.g., a number of stacked vias) of the rivet cell 110 to an energy release rate (ERR) of the structure 102. In an example embodiment, multiple rivet cells can be placed within a large contiguous hotspot region. In an example, the rivet cell 110 can be composed of an electrically conductive metal or electrically conductive metal alloy, such as copper (Cu), aluminum (Al), tungsten (W), or an alloy thereof such as, for example, a Cu—Al alloy. In an example, the rivet cell 110 metal and via stacks could also include liner materials such as TaN or TiN that can be part of the typical BEOL build processes for each metal and via level. The structure 102 can be formed utilizing techniques well known to those skilled in the art. For example, the various dielectric regions can be formed utilizing a deposition process such as, for example, CVD, PECVD, and spin-coating. The rivet cell 110 and stacked vias can be formed utilizing a damascene process.

In the example shown in FIG. 1, the rivet cell 110 can extend through the stress hotspot 105, and can span from a section of the dielectric region 101c, thread through an entirety of the dielectric regions 101d and 101e, and ends at a section of the dielectric region 101f. Further, in some examples, the structure 102 can include more than one rivet cell. For example, the rivet cell 110 can be located at a lateral distance L1 away from a corner 107 of the structure 102, and another rivet cell 111 can be located at a lateral distance L2 away from a corner 108 of the structure 102. In an example, a rivet cell can be located in proximity to each corner of the structure 102. The lateral distances L1 and L2 can be the same, or can be different, and each one of the lateral distances can be based on a location of a stress hotspot of the semiconductor device 100. Further, each rivet cell can have a different length or size. For example, the rivet cell 110 can be longer (e.g., having more stacked vias) than the rivet cell 111. Furthermore, each rivet cell can thread through different dielectric regions to alleviate the potential of occurrences of cracks or delamination at different interfaces between dielectric regions. For example, the rivet cell 110 can be positioned to prevent a crack that can potentially occur at an interface 106 between the dielectric region 101d and 101e, and the rivet cell 111 can be positioned to prevent a crack that can potentially occur at another interface between the dielectric region 101e and 101f.

Figure 1B:
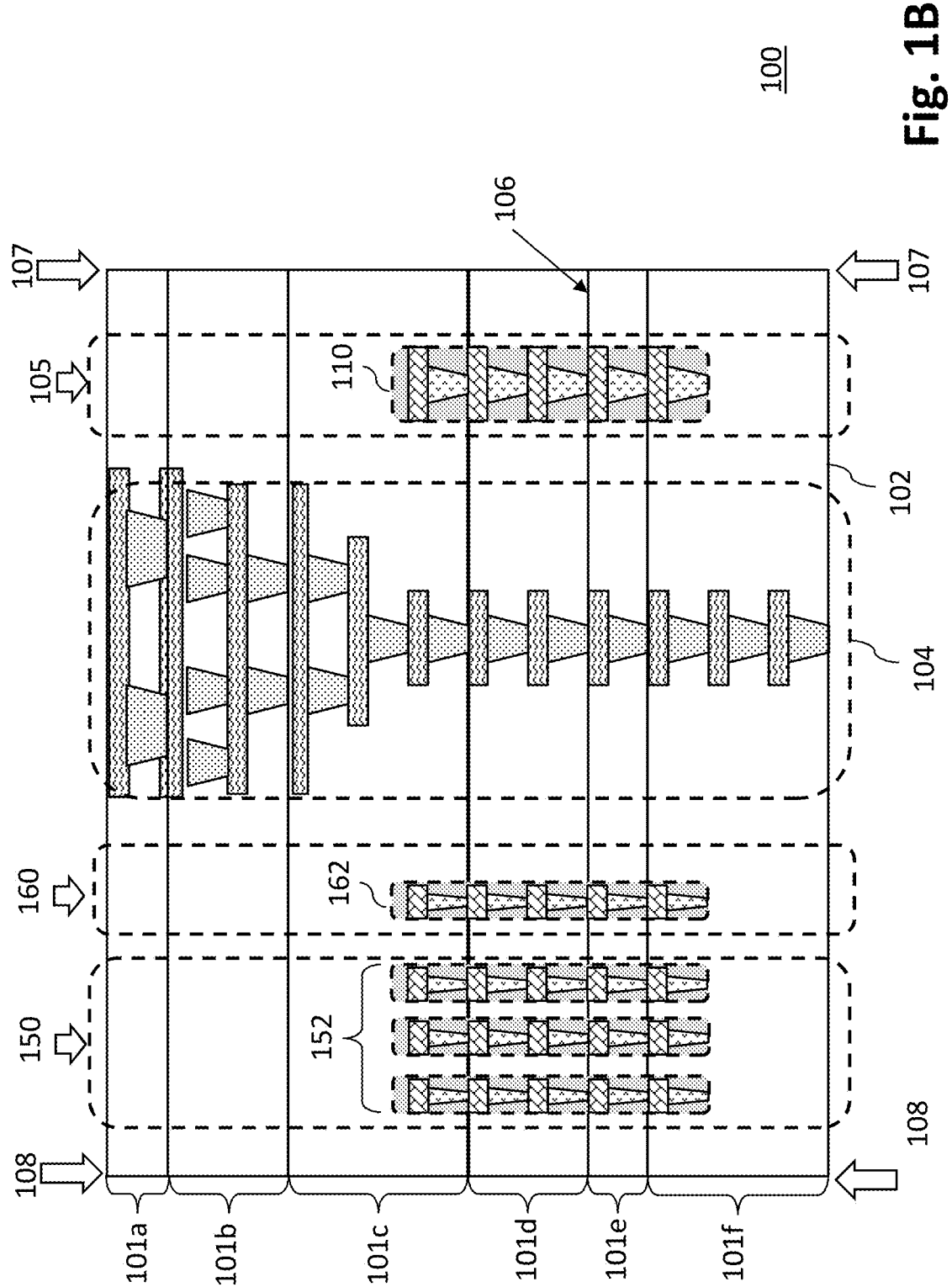
FIG. 1B is a cross sectional view of the structure of FIG. 1A with additional rivet cells, in one embodiment.

FIG. 1B is a cross sectional view of the structure 102 of FIG. 1A with additional rivet cells, in one embodiment. In an example shown in FIG. 1B, a hotspot region (or "hotspot") 150 can be near, or in proximity, to the corner 108 of the structure 102. The hotspot 150 can be relatively large in width (e.g., horizontal, side-to-side) when compared with the width of a single rivet cell (e.g., rivet cell 110). In an example embodiment, a width of the hotspot 150 can span an area (e.g., in a horizontal direction, side-to-side manner) of an order of approximately 3 millimeters (mm)×3 mm, and a width of a rivet cell can be relatively small in size, such as spanning an area of an order of approximately 0.5 micrometers (um)×0.5 um. In an example, due to the relatively large width difference between a hotspot and a rivet cell, a significantly large number of rivet cells (e.g., hundreds, thousands, millions) can be inserted in one hotspot location. Note that the hotspots near each corner (e.g., corner 107, corner 108, etc.) among the four chip corners of the structure 102 can have the same or different width, and each rivet cell within the structure 102 can have the same or different width. In an example, in order to cover the entire 3 mm×3 mm hotspot region 150 as much as possible, multiple rivet cells 152 can be inserted in a location of the hotspot region 150. In some examples, live circuitry can overlap with a hotspot location and it may not be desirable to insert rivet cells in locations that overlap with the live circuitry. Thus, the methods and systems described herein can determine precise insertion locations, and sizes, of the rivet cells, to avoid the inserted rivet cells overlapping or interfering with the live circuitry of the structure 102. In another example embodiment, multiple hotspot regions can be near a corner of the structure 102. For example, as shown in FIG. 1B, the hotspot region 150 and another hotspot region 160 can be in proximity to the corner 108. The hotspot regions 150 and 160 can have their respective set of rivet cells, such as rivet cells 152 located in the hotspot region 150 and a rivet cell 162 located in the hotspot region 160. The insertion of multiple rivet cells in the structure 102 can prevent delamination or cracking in the dielectric interfaces in the entire length (e.g., vertical direction) of the hotspot regions identified in the structure 102.

Figure 2:
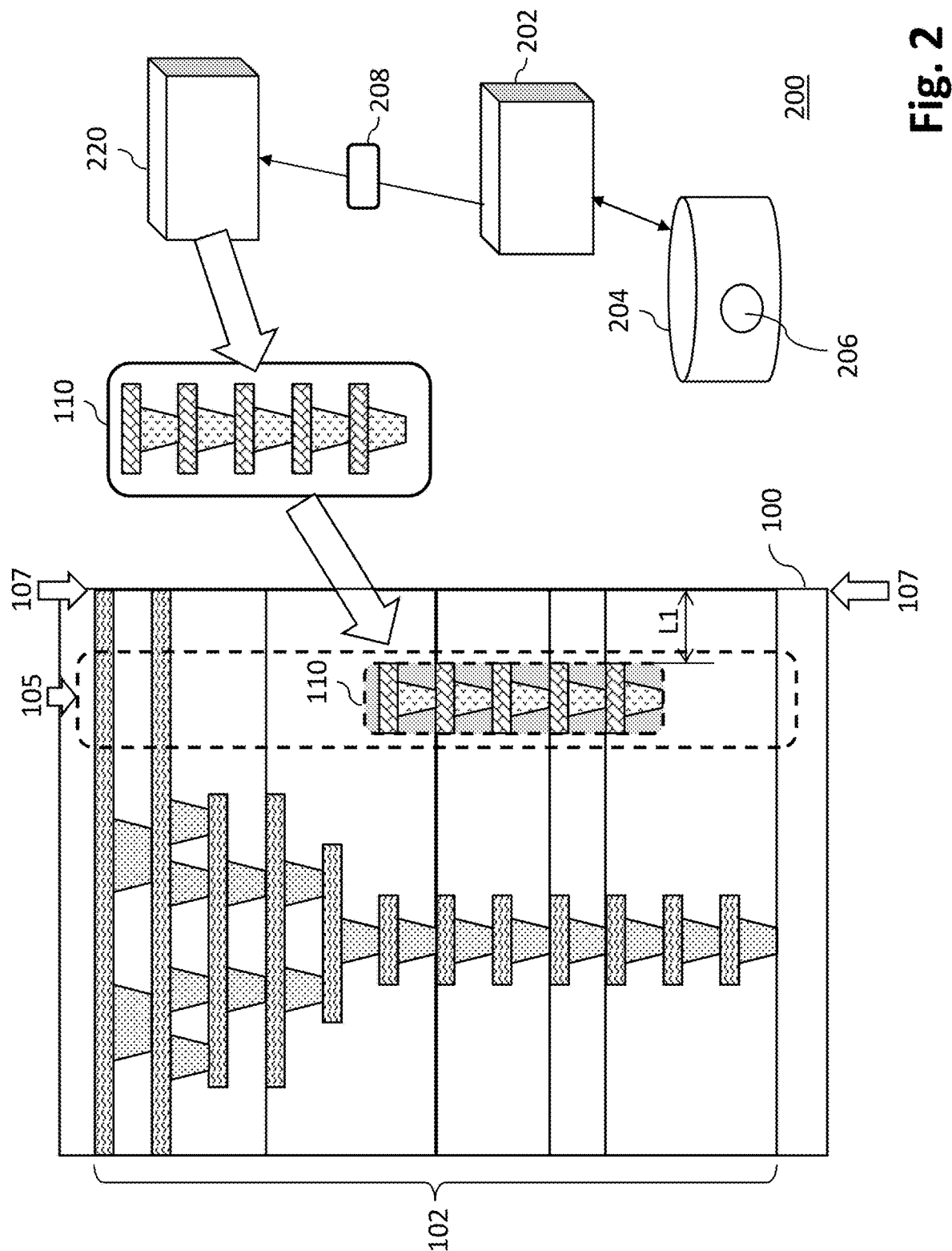
FIG. 2 is a diagram illustrating an example system that can be implemented to construct a rivet cell in one embodiment.

FIG. 2 is a diagram illustrating an example system that can be implemented to construct a rivet cell in one embodiment. The system 200 can include a processor 202, a memory 204, and a device 220. The processor 202 can be configured to be in communication with the memory 204 and the device 220. In some examples, the processor 202 and the memory 204 can be components of the same device, such as a computing device. The device 220 can be, for example, a device or machine (e.g., dicing machine) configured to perform various fabrication techniques to construct the structure 102.

The memory 204 can be configured to store a set of instructions 206. The instructions 206 can include code, such as source code and/or executable code, that can be executable by the processor 202 to generate rivet cell data 208. In some examples, the instructions 206 can be an executable application (e.g., software) that can be executable by the processor 202 to perform various modeling techniques (described below). The rivet cell data 208 can include data relating to one or more rivet cells (e.g., rivet cells 110, 111 152, 162 shown in FIGS. 1A and/or 1B), and can include instructions (e.g., executable code) that can be executable by the device 220 to construct the structure 102 with the rivet cell 110. For example, the rivet cell data 208 can include data such as a length of the rivet cell 110 (e.g., number of vias in the stacked vias of the rivet cell 110), a location of the hotspot 105 (e.g., distance of the hotspot from the corner 107), the one or more dielectric regions to where the rivet cell 110 shall thread through, and/or other types of data relating to the rivet cell 110. Further, data indicating distances between rivet cells (e.g., rivet cells 110, 111, 152, 162) and the corner that may be closest to these rivet cells can be included in the rivet cell data 208. The instructions being included in the rivet cell data 208 can be, for example, a set of executable code, such as fill insertion code, that can be executable by the device 220 to fill the structure 102 with one or more rivet cells (e.g., rivet cells 110, 111, 152, 162, etc.) at the locations indicated by the rivet cell data 208. In some examples, the rivet cell data 208 can be provided to the device 220 as an input to an application being run by the device 220, where the application can be run by the device 220 to construct the structure 102 and the rivet cell 110. Further, the application being run by the device 220 can construct the structure 102 and/or different rivet cells, such as 110, 111, 152, 162, and other rivet cells that need to be placed in all the hotspot regions in the structure 102.

Figure 3A:
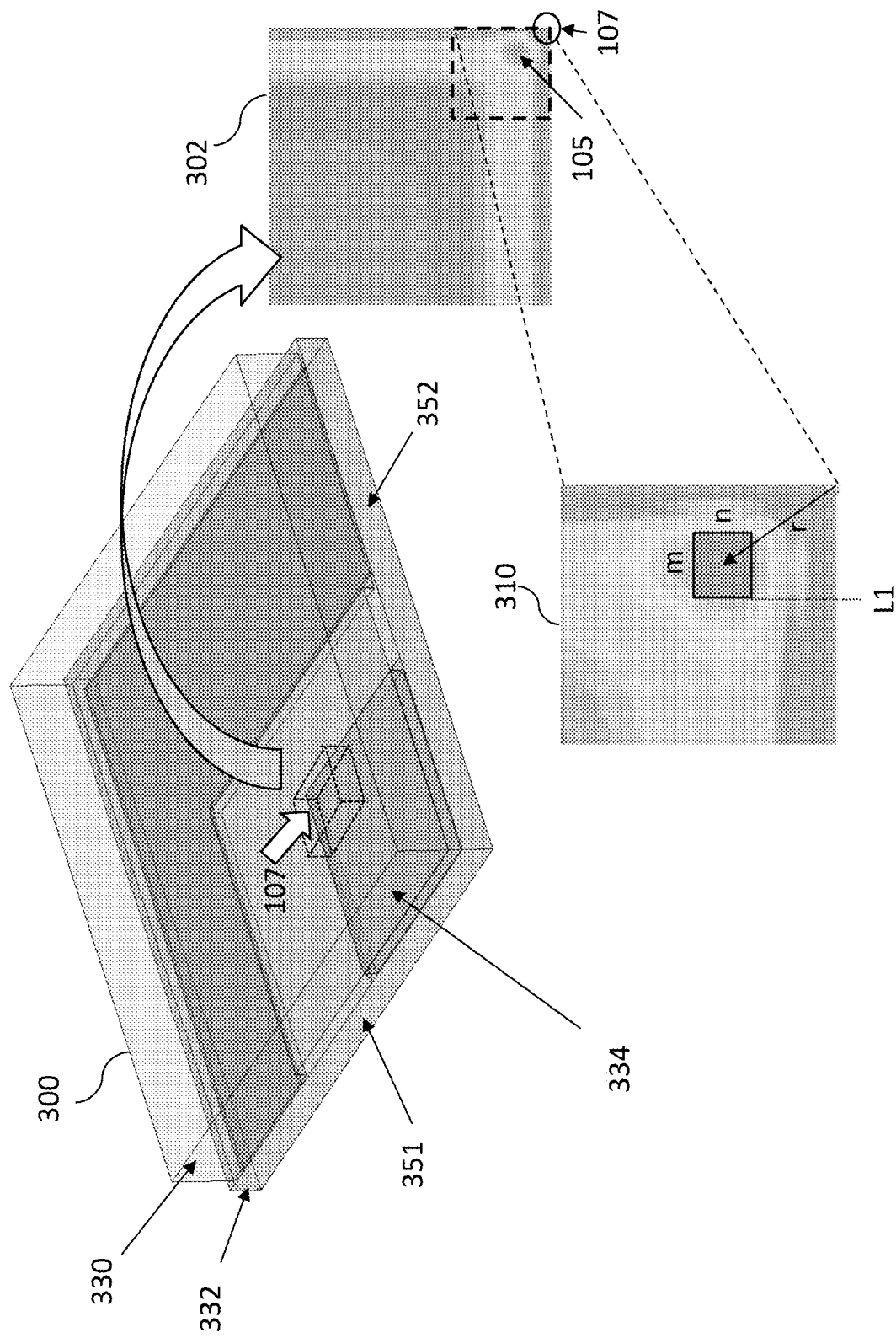
FIG. 3A is a diagram illustrating an example implementation of stress hotspot modeling that can be used to identify a stress hotspot on a structure, in one embodiment.
Figure 3B:
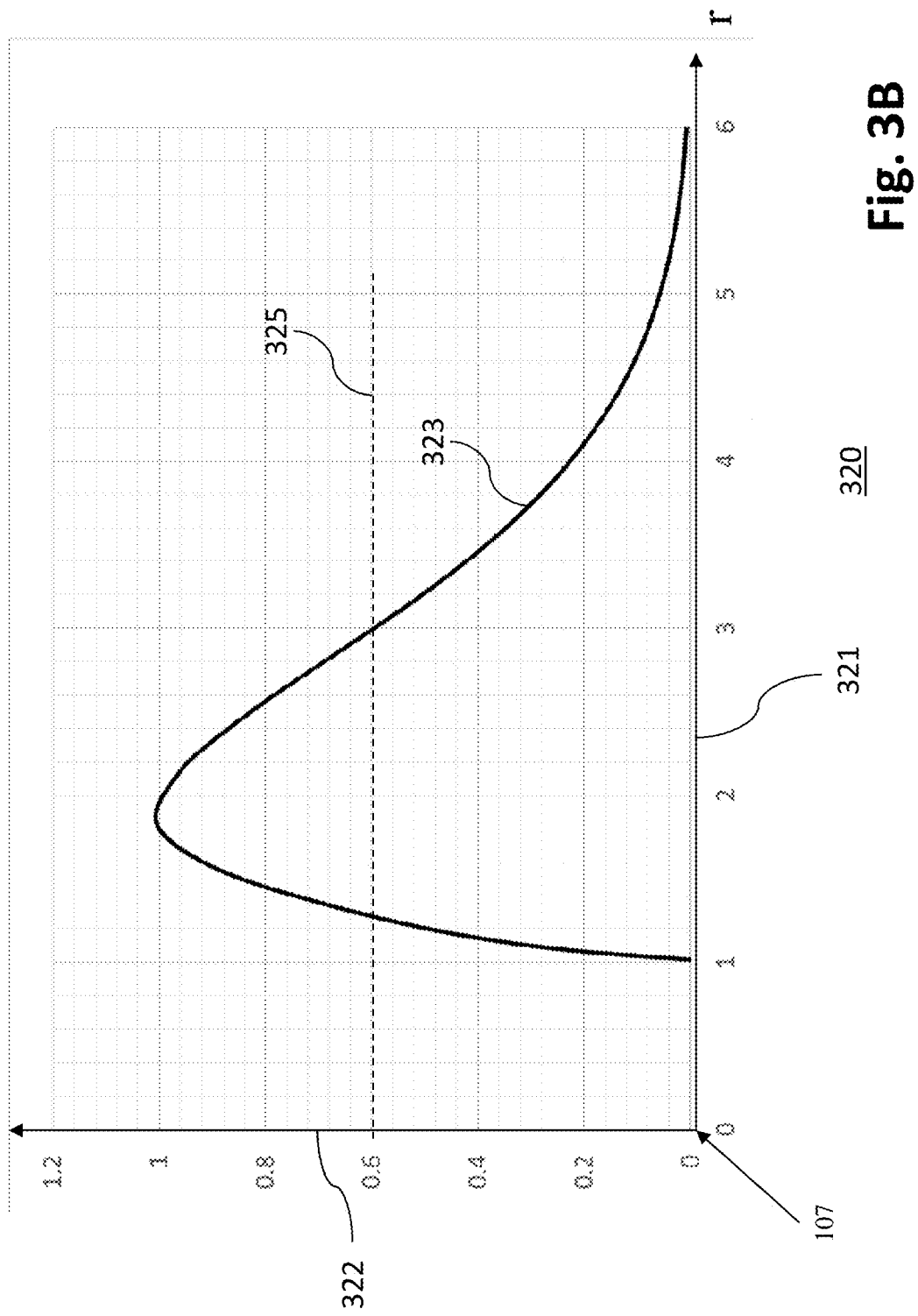
FIG. 3B is a diagram illustrating a plot from an implementation of stress hotspot modeling of FIG. 3A in one embodiment.

FIGS. 3A and 3B are diagrams illustrating an example implementation of stress hotspot modeling that can be used to identify a stress hotspot on a structure, in one embodiment. In an example, the generation of the rivet cell data 208 can include stress hotspot modeling to determine a location of the stress hotspot 105, and energy release rate (ERR) modeling to determine a length of the rivet cell 110. In an example shown in FIG. 3A, in order to perform the stress hotspot modeling and energy release rate (ERR) modeling, the processor 202 (shown in FIG. 2) can be configured to execute the instructions 206 (shown in FIG. 2) to generate a model 300 of at least a portion of a chip package that includes the semiconductor device 100. In some examples, the model 300 can be a virtual three-dimensional (3D) model of at least a portion of the chip package including the semiconductor device 100. In some examples, the processor 202 can execute the instructions 206 to run an application (or software) to generate the model 300. Examples of such applications can include, but not limited to, software such as SIMULIA ABAQUS. In the example shown in FIG. 3A, the model 300 can be, for example, a quarter cutout of an overall chip package located about a plane 351 and a plane 352. The model 300 can include modeled components such as a lid 330, a printed circuit board (PCB) 332, and a die 334. In an example, the semiconductor device 100 in FIG. 1A or FIG. 1B can be part of the die 334 in the model 300.

In some examples, the processor 202 can receive inputs (e.g., user inputs) indicating dimensions of various aspects or components of the model 300. For example, the semiconductor device 100 can be a chip package, and the model 300 can be a virtual model for the chip package. The inputs being received by the processor 202 can include, but not limited to, a PCB size, a die size, a lid size, an underfill size, a thermal interface material (TIM) size, etc. along with the materials properties of the PCB, die, lid, underfill, TIM, etc.

The processor 202 can execute the instructions 206 to perform a virtual thermal stress analysis on the model 300 to generate an output indicating how different spots of the semiconductor device 100 (modeled as the model 300) may react to thermo-mechanical stress. For example, an output 302 can include a contour map representing a top perspective view of a portion of the model 300. The contour map can be coded in different shades to represent different levels of thermo-mechanical stress. The processor 202 can identify the hotspot 105 in the output 302, where the hotspot may have significantly different shade when compared to other areas of the output 302. In the example shown in FIG. 3A, the hotspot 105 can be identified at a location with a diagonal distance of approximately r units away from the corner 107.

In an example, the processor 202 can determine a size of a m×n region that can sufficiently cover the hotspot 105. For example, the processor 202 can initialize m=1 millimeter (mm) and n=1 mm, and determine whether the 1 mm×1 mm region is sufficient to cover the hotspot 105 shown in the output 302. In response to the 1 mm×1 mm region being insufficient to cover the hotspot 105, the processor 202 can increment the values of m and n, such as m=2 mm and n=2 mm, and determine whether the 2 mm×2 mm region is sufficient to cover the hotspot 105 shown in the output 302. In response to the determining values of m and n that are sufficient to cover the hotspot 105, the processor 202 can include the values of m, n, and r in the rivet cell data 208. Note that the values of m and n can define a lateral cross-sectional area of the rivet cell 110. In some examples, the instructions 206 can define a limit (e.g., 3 mm) to the values of m and n to avoid potential overlap or contact with other vias and/or components in the structure 102. The processor 202 can further identify hotspots in proximity to all corners (e.g., four corners) of the model 300, and determine corresponding values of m, n, r, and include the determined values in the rivet cell data 208.

FIG. 3B illustrates a plot 320 that can model a relationship between a level of stress and a distance away from a corner of the semiconductor device 100. In the plot 320, the axis 321 corresponds to the distance (e.g., in millimeters) away from a corner (e.g., corner 107) of the semiconductor device 100, and the axis 322 represents a level of normalized stress where 1 represents the maximum stress. The axis 321 can be the along the radius marked r from the corner 107 as seen in FIG. 3A. The curve 323 represents the changes to the stress level in response to different values of distance away from the corner. As shown by the plot 320, the curve 323 can increase significantly between approximately 1.0 mm to 1.8 mm, but decreases after 1.8 mm away from the corner. In the example shown in FIG. 3B, the curve 323 can be within a normalized stress range from 0 to 1. A hotspot region could be defined where the normalized stress is larger than a stress threshold 325 (e.g., 0.6). In this case, the hotspot region can be between approximately 1.3 mm and 3 mm from the corner 107. The behavior of curve 323 can vary with package geometry and material properties and can be determined by running appropriate models.

Figure 4:
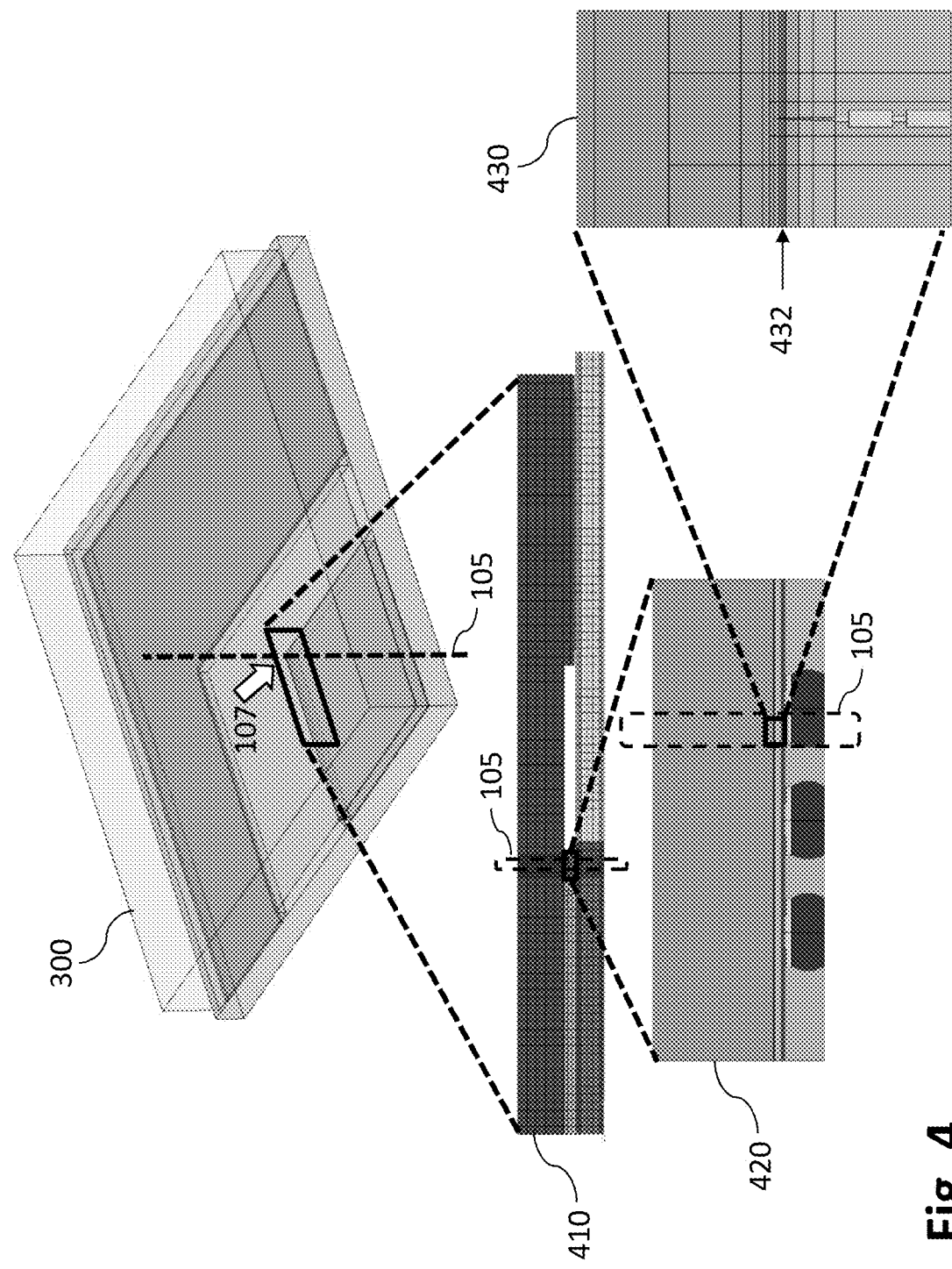
FIG. 4 is a diagram illustrating example models that can be used to perform energy release rate modeling in accordance with the present disclosure.

FIG. 4 is a diagram illustrating example models that can be used to perform energy release rate modeling in accordance with the present disclosure. In order to perform the energy release rate (ERR) modeling, the processor 202 (shown in FIG. 2) can be configured to execute the instructions 206 (shown in FIG. 2) to extract one or more submodels from the model 300. In the example shown in FIG. 4, the processor 202 can extract a submodel 410 from the model 300, where the submodel 410 can be a two-dimensional (2D) or three-dimensional (3D) model showing a cross sectional area of the model 300 from one side perspective (e.g., front, back, left side, right side). The example illustrated here is for a representative 2D model. The processor 202 can further extract another submodel 420 from the submodel 410, where the submodel 420 can be another 2D model showing a portion of the submodel 410. The processor 202 can further extract another submodel 430 from the submodel 420, where the submodel 430 can be another 2D model showing a portion of the submodel 420.

The processor 202 can be configured to extract different submodels based on a scale factor. For example, the submodel 410 can be a 2D model with mesh size (e.g., size of grids or nodes being used to render the submodel) in the millimeter scale, the submodel 420 can be a 2D model with mesh size in the micrometer scale, and the submodel 430 can be a 2D model with mesh size in the nanometer scale. In some examples, the processor 202 can receive inputs (e.g., user inputs) indicating the number of submodels to generate, the scale difference between the submodels, dimensions of various aspects or components of the model 300, materials (and their characteristics) to be used for constructing the structure 102 and/or the semiconductor device 100, and/or characteristics of the materials. For example, the inputs can indicate BEOL material process of record (POR) properties, plasticity effects of the materials, boundary conditions (free surfaces or fixed surfaces, etc.), loading conditions (e.g., cool down within a temperature range), etc.

The processor 202 can further project an anomaly on the model 300, or on one of the generated submodels. In the example shown in FIG. 4, the processor 202 can project a crack 432 on one of the interfaces between pairs of dielectric regions in the submodel 430. In some examples, the processor 202 can extract the submodels 410, 420, 430 based on the stress hotspot identified from the stress hotspot modeling discussed above. For example, upon identifying the stress hotspot 105 in proximity to the corner 107, the processor 202 can extract a portion of the model 300 that includes the location of the stress hotspot 105, such as the submodel 410. The processor 202 can further extract subsequent submodels that include the location of the stress hotspot 105, such as the submodels 420 and 430. Based on the location of the stress hotspot 105, the processor 202 can project the crack 432 at the location of the stress hotspot 105. Upon projecting the anomaly (e.g., crack 432) on the model 300, the processor 202 can execute the instructions 206 to model a relationship between a length of the rivet cell 110 and energy release rate of the semiconductor device 100.

Figure 5:
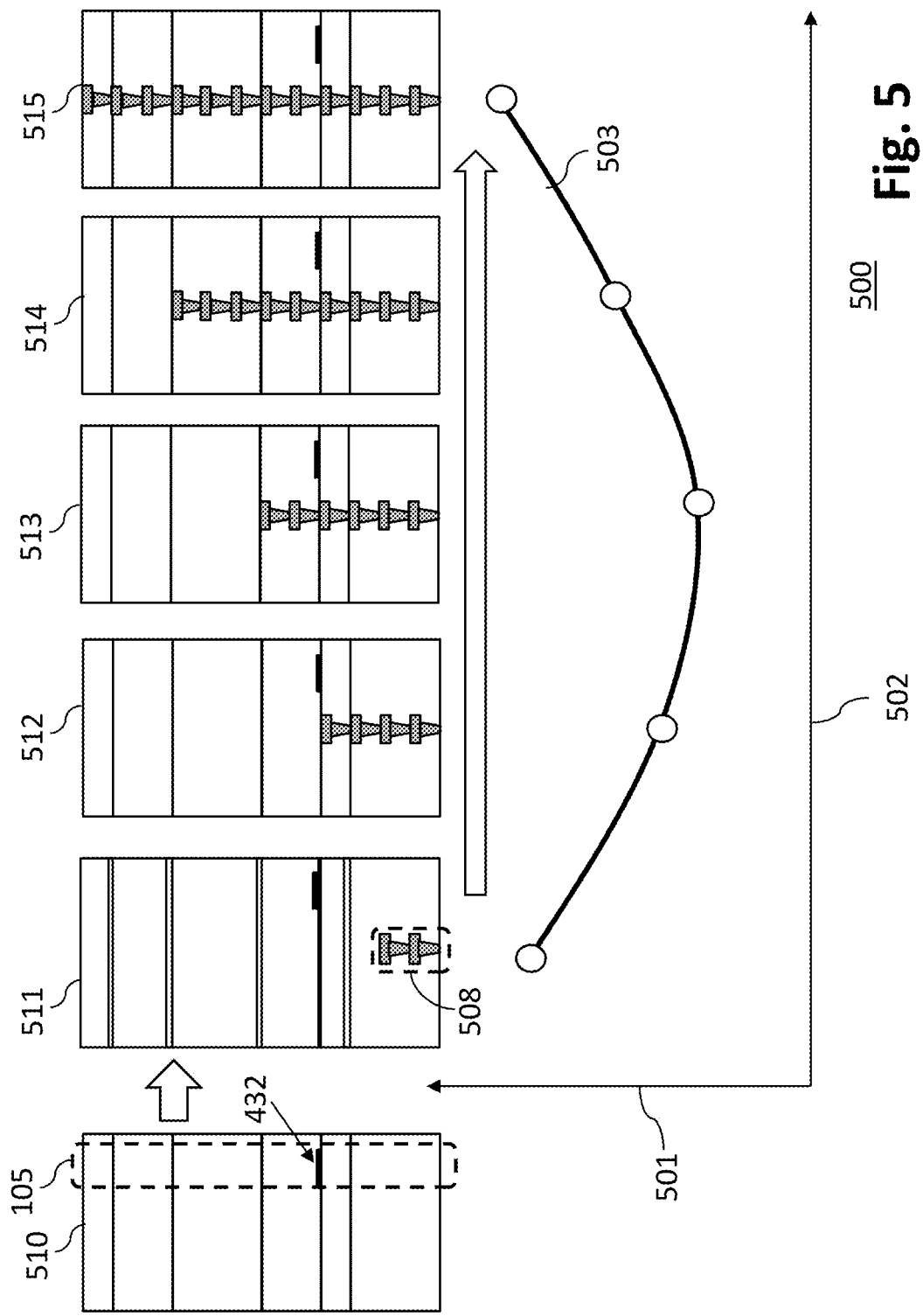
FIG. 5 is a diagram illustrating an example implementation of energy release rate modeling that can be used to identify a length of a rivet cell in one embodiment.

FIG. 5 is a diagram illustrating an example implementation of energy release rate modeling that can be used to identify a length of a rivet cell in one embodiment. The processor 202 can run the instructions 206 to perform an energy release rate (ERR) modeling 500. The output of the ERR modeling 500 can include data representing a relationship between a length of the rivet cell 110 (e.g., the number of stacked via sets in the rivet cell 110) and an energy release rate (ERR) of the semiconductor device 100. In particular, the ERR modeling 500 performed by the processor 202 can be performed under a projection of an anomaly, such as the crack 432, at the hotspot 105 and on a particular interface between a pair of dielectric regions. For example, in the example shown in FIG. 5, the crack 432 can be projected on an interface between the dielectric regions 101d and 101e (see FIG. 1).

In an example, upon a completion of the ERR modeling 500 with the crack 432 projected on the interface between the dielectric regions 101d and 101e, the processor 202 can remove the projected crack 432 from the submodel 430 (in FIG. 4) and project another anomaly on another interface between another pair of dielectric regions. The processor 202 can perform the ERR modeling 500 on interfaces between each pair of dielectric regions, or a selective number of dielectric region pairs, based on the anomaly projections at the identified stress hotspots (e.g., near each corner) of the semiconductor device 100.

In another example, the processor 202 can perform the ERR modeling on selected interfaces. For example, using FIG. 1A as a reference, the dielectric region 101f can have a dielectric constant value of k=2.7, the dielectric region 101e can have a dielectric constant value of k=2.7, the dielectric region 101d can have a dielectric constant value of k=2.55, the dielectric region 101c can have a dielectric constant value of k=2.7, and the dielectric region 101b can have a dielectric constant value of k=3.0. Note the values of k presented herein are merely example values, other values of k corresponding to low k, ultra low k, hard dielectrics, and the like, are also possible. In an example, based on the arrangement of the dielectric regions of the structure 102, the processor 202 can identify a dielectric region that can be relatively more vulnerable to cracks or delamination. For example, the processor 202 can compare the values of k between adjacent dielectric regions. Based on the comparison between dielectric regions 101e (k=2.7) and 101d (k=2.55), and between 101d (k=2.55) and 101c (k=2.7), the processor 202 can determine that the dielectric region 101d is "sandwiched" between two dielectric regions with relatively higher k. Based on the identification of a vulnerable region (e.g., dielectric region 101d), the processor 202 can determine that the interfaces contacting the dielectric region 101d can be relatively more vulnerable to cracks. In another example, if a first dielectric region and a second dielectric region are adjacent to each other (e.g., stacked on one another) and if the first and second dielectric regions are categorized as different stiffness (e.g., hard dielectric and soft dielectric), then the processor 202 can determine that the interfaces between the first and second dielectric regions can be relatively more vulnerable to cracks. The processor 202 can run the ERR model with a projected anomaly on the interface 106 between dielectric regions 101e and 101d. The processor 202 can further run the ERR model with a projected anomaly on the interface between dielectric regions 101d and 101c. In the example shown in FIG. 5, the processor 202 can project the crack 432 at the interface 106 (see FIG. 1) to run the ERR model. In another example, the processor 202 may determine that the interface between two low k regions, such as the dielectric regions 101e and 101f, may not be vulnerable to have cracks since the dielectric constants are the same (e.g., dielectric regions 101e and 101f having same stiffness). Therefore, the processor 202 may not need to run the ERR model on modeled structures having project anomalies at the interface between dielectric regions 101e and 101f.

In the example shown in FIG. 5, the processor 202 can initiate the ERR modeling 500 by generating a modeled structure 510, where the modeled structure 510 can be a virtual prototype of the plurality of dielectric regions of the structure 102, with the projected crack 432 location at the location of the hotspot 105. The ERR modeling 500 can progress through different modeled structures having different number of vias in a stacked vias 508. For example, the ERR modeling 500 can progress in an order starting with the least number of vias among the stacked vias 508 to the most vias among the stacked vias 508. In the example shown in FIG. 5, the ERR modeling 500 can progress in an order of modeled structures 511, 512, 513, 514, and end at 515. Although the ordered modeled structures 511, 512, 513, 514, 515 are shown herein, additional modeled structures can be included in the ERR modeling 500 before, after, or in between any one of the shown modeled structures 511, 512, 513, 514, 515. The rivet cell with the least ERR from among the modeled structures 511, 512, 513, 514, 515 can be chosen or selected as the optimal rivet cell (e.g., having optimal length). In the example in FIG. 5, the modeled structure 513 has the least ERR. The ERR can be a measure of a propensity to crack. The larger the ERR the higher the likelihood of cracking. Thus, the rivet cell in the modeled structure 513, for example, can be the optimal choice. In an example, ERR is the energy that is released per unit area of crack propagation. Numerically, ERR can represent the energy available at the crack tip due to the crack geometry, material properties, and the external stresses induced on the free body. Further, each material can have a unique property referred to as the "critical" energy release rate. A crack can propagate if (and only if) the ERR at the crack tip exceeds the critical ERR of the material. Hence, a lowest possible ERR for a given crack geometry and material conditions can be desirable in chip design and construction.

In an example, the instructions 206 can include algorithms and/or code relating to finite element analysis such that the processor 202 can execute the instructions 206 to perform finite element analysis on the structure 102. Finite element analysis (FEA) can be referred to as a computerized method for predicting how the structure 102 may react to real-world forces such as, vibration, heat, fluid flow, and/or other forces. The finite element analysis performed by the processor 202 can provide predictions on how the structure 102 may react to the different number of vias being included in the vias 508. One of the reactions that can be monitored is the ERR. The ERR can be indicative of negative effects on the structure 102 in response to a presence of cracks or delamination. Therefore, it may be desirable to construct a structure having a low ERR.

To begin the ERR modeling 500, the processor 202 can gradually add vias to the stacked vias 508 and calculate the ERR in response to the added vias. In the example shown in FIG. 5, an axis 501 can represent values of the ERR of the modeled structures in FIG. 5, and an axis 502 can represent the number of vias in the stacked vias 508. A curve 503 can represent a relationship between an observed ERR and the length or the number of vias in the stacked vias 508. A curve 503 can represent a relationship between an observed ERR and the length or the number of vias in the stacked vias 508 under a condition that the modeled structure 510 includes the projected crack 432. As shown in FIG. 5, the ERR of the modeled structure 510 without the projected crack 432 is expected to decrease as more vias are being added to the stacked vias 508, but when the modeled structure 510 includes the projected crack 432, the observed ERR increases after a certain number of vias is added to the stacked vias 508. In an example, this minimum value can occur due to mechanisms such as cracking imposed by, and chip level hotspots created by, the thermo-mechanical loads coming from the differential thermal expansions of the different materials in the chip package (e.g., the chip package being modeled as the model 300 in FIG. 3A) of the structure. In the example shown in FIG. 5, the modeled structure 515 includes a rivet cell that threads along an entirety of the structure (e.g., through the whole set of dielectrics), which can cause a vertical tension that can cause additional cracking propensity. Thus, the modeling examples shown in FIG. 2 and FIG. 4 can allow the system 200 to identify an optimal size of a rivet cell (e.g., modeled structure 513) that allows the ERR criterion to be minimum. Technologies that have a different BEOL thicknesses with different dielectric stacks can utilize the modeling processes described herein to identify hotspots and prevent cracking and crack propagation.

Based on the relationships modeled by the curve 503, the processor 202 can identify an optimal length of the rivet cell 110. For example, the processor 202 can identify a minimum point on the curve 503 that corresponds to a minimum ERR. In response to identifying the minimum point, the processor 202 can identify the modeled structure that corresponds to the identified minimum ERR. In the example shown in FIG. 5, the modeled structure 513 appears to correspond to the minimum ERR on both the curve 503. The processor 202 can set the length of the rivet cell 110 based on the stacked vias 508 in modeled structure 513. In an example, the length of the rivet cell 110 can have the identical number of vias as the stacked vias 508 in the modeled structure 513. In another example, the processor 202 can remove one or more vias from the stacked vias 508 of the modeled structure 513 based on factors such as local via density restrictions, ERR, and other thermo-mechanical stresses in the modeling domain along with the BEOL stack used in the technology, the different dielectrics used, and the respective dielectric thicknesses. Upon setting the length of the rivet cell 110, the processor 202 can include the length of the rivet cell 110 in the rivet cell data 208.

Figure 6:
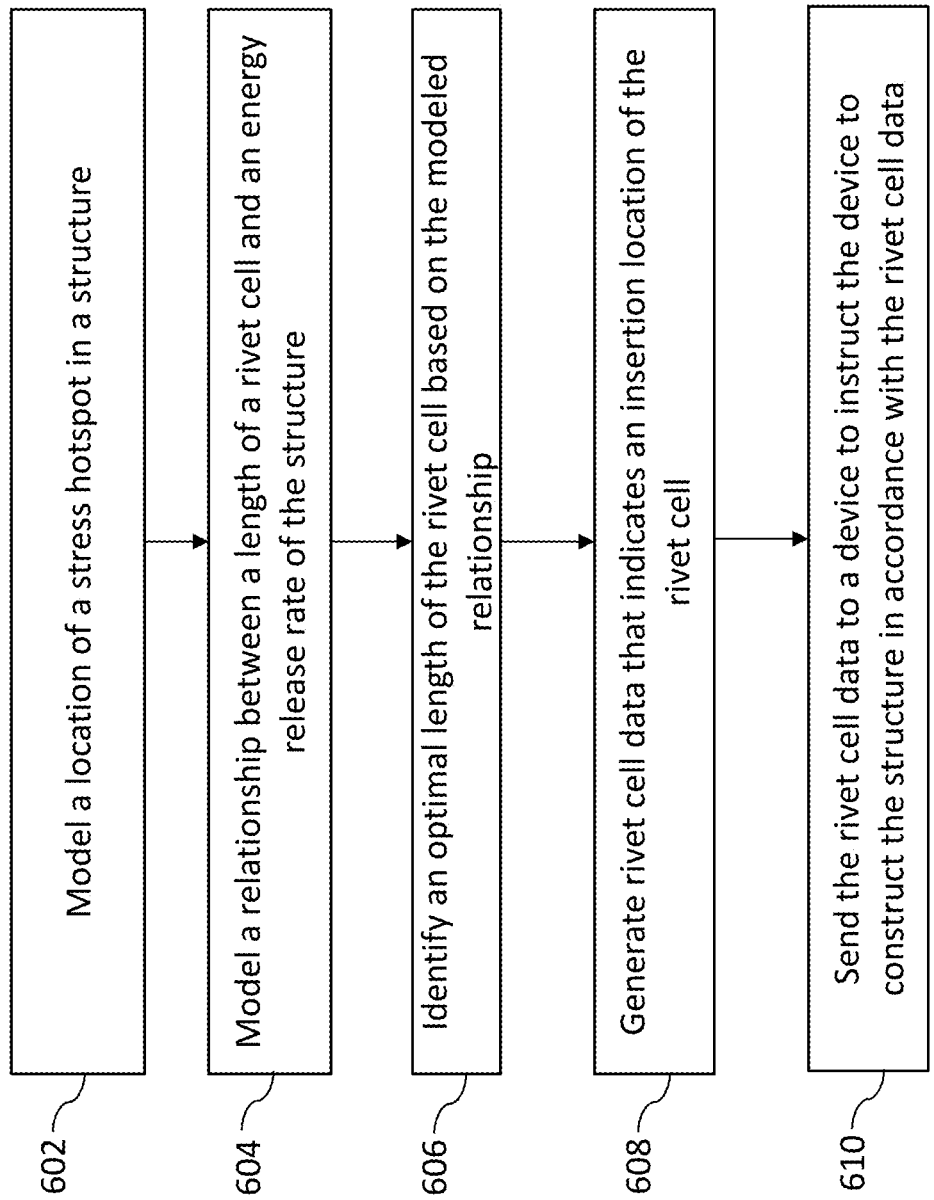
FIG. 6 illustrates a flow diagram relating to stacked via rivets in chip hotspots in one embodiment.

FIG. 6 illustrates a flow diagram relating to stacked via rivets in chip hotspots in one embodiment. The process 600 in FIG. 6 may be implemented using, for example, computer system 200 discussed above. An example process may include one or more operations, actions, or functions as illustrated by one or more of blocks 602, 604, 606, 608, and/or 610. Although illustrated as discrete blocks, various blocks may be divided into additional blocks, combined into fewer blocks, eliminated, or performed in parallel, depending on the desired implementation.

The process 600 can be a process for determining a location of a rivet cell in a structure. The process 600 can begin at block 602, where a device can model a location of a stress hotspot in a structure. In some examples, the device can generate a three-dimensional (3D) model of the structure, execute an instruction to perform stress analysis on the 3D model, and identify the location of the stress hotspot from an output of the stress analysis.

The process 600 can proceed from block 602 to block 604. At block 604, the device can model a relationship between a length of a rivet cell and an energy release rate of the structure. In some examples, the device can model the relationship based on a projection of an anomaly at the location of the stress hotspot and on an interface between a first dielectric region and a second dielectric region among the plurality of dielectric regions. In some examples, the energy release rate of the structure can be based on the location of the projected anomaly. In some examples, the projected anomaly can be a crack at the interface between the first dielectric region and the second dielectric region. In some examples, the first dielectric region and the second dielectric region can have different values of dielectric constant. In some examples, the rivet cell can be among a number of rivet cells inserted in the stress hotspot, and the number of rivet cells can be based on a size of the stress hotspot.

The process 600 can proceed from block 604 to block 606. At block 606, the device can identify an optimal length of the rivet cell based on the modeled relationship. In some examples, the device can identify the optimal length of the rivet cell by identifying a length of the rivet cell that results in a lowest energy release rate.

The process 600 can proceed from block 606 to block 608. At block 608, the device can generate rivet cell data that indicates an insertion location of the rivet cell. The insertion location can be based on the location of the stress hotspot. In some examples, the rivet cell data can further indicate multiple insertion locations of multiple rivet cells. The multiple insertion locations can be within the stress hotspot. In some examples, the insertion location can be located at a lateral distance from a corner of the structure.

The process 600 can proceed from block 608 to block 610. At block 610, the device can send the rivet cell data to a device to instruct the device to construct the structure in accordance with the rivet cell data. The structure can be constructed to include the rivet cell at the insertion location. The rivet cell can extend through the stress hotspot of the structure, and can thread through at least one dielectric region among a plurality of dielectric regions of the structure. In some examples, upon the insertion of the rivet cell, the rivet cell can thread through at least a portion the first dielectric region and at least a portion of the second dielectric region.

Figure 7:
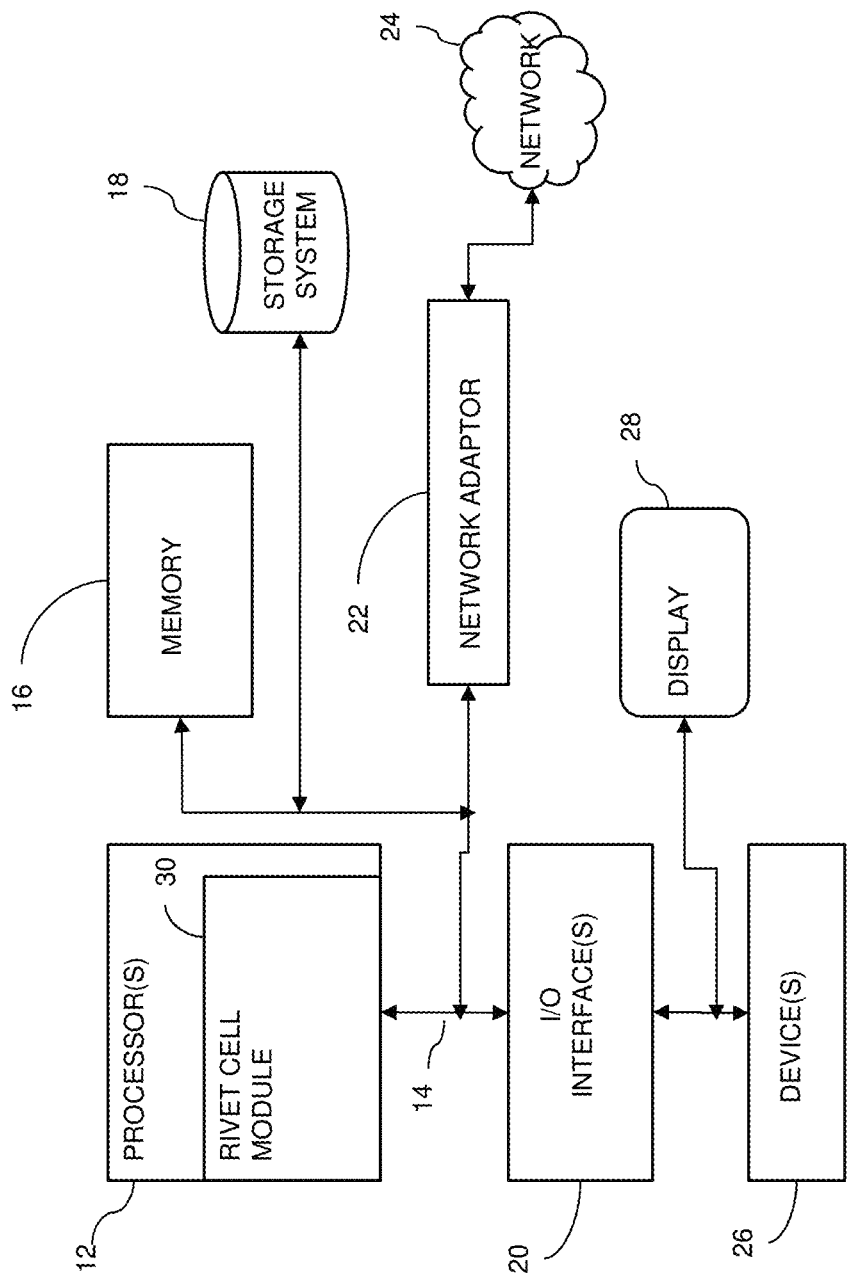
FIG. 7 illustrates a schematic of an example computer or processing system that may implement a generation of stacked via rivets in chip hotspots in one embodiment.

FIG. 7 illustrates a schematic of an example computer or processing system that may implement a generation of stacked via rivets in chip hotspots in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, mobile phones, tablet computers, wearable devices, virtual reality devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executable by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., rivet cell module 30) that performs the methods described herein. The module 30 may be programmed into the integrated circuits of the processor 12, or loaded from system memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus, and universal serial bus (USB).

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage device 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. Other examples of non-volatile memory or storage media can include, for example, flash memory, magnetoresistive random-access memory (MRAM), In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), WI-FI, a cellular network (e.g., 3G, 4G, 5G, Long-Term Evolution (LTE)), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A method for determining a location of a rivet cell in a structure, the method comprising:
   modeling a location of a stress hotspot in a structure;
   modeling a relationship between a length of a rivet cell and an energy release rate of the structure;
   identifying an optimal length of the rivet cell based on the modeled relationship;
   generating rivet cell data that indicates an insertion location of the rivet cell, wherein the insertion location is based on the location of the stress hotspot; and
   sending the rivet cell data to a device to instruct the device to construct the structure in accordance with the rivet cell data, such that the structure is constructed to include the rivet cell at the insertion location, and such that the rivet cell extends through the stress hotspot of the structure, and threads through at least one dielectric region among a plurality of dielectric regions of the structure.

2. The method of claim 1, wherein the rivet cell data further indicates multiple insertion locations of multiple rivet cells, the multiple insertion locations being within the stress hotspot.

3. The method of claim 1, wherein:
   modeling the relationship is being performed based on a projection of an anomaly at the location of the stress hotspot and on an interface between a first dielectric region and a second dielectric region among the plurality of dielectric regions;
   upon the insertion of the rivet cell, the rivet cell threads through at least a portion the first dielectric region and at least a portion of the second dielectric region; and
   the energy release rate of the structure is based on the location of the projected anomaly.

4. The method of claim 3, wherein the projected anomaly is a crack at the interface between the first dielectric region and the second dielectric region.

5. The method of claim 3, wherein the first dielectric region and the second dielectric region has different values of dielectric constant.

6. The method of claim 1, wherein the stress hotspot is among a plurality of stress hotspots across the structure, and each stress hotspot include a respective set of rivet cells.

7. The method of claim 1, wherein the rivet cell is among a number of rivet cells inserted in the stress hotspot, and the number of rivet cells is based on a size of the stress hotspot.

8. The method of claim 1, wherein identifying the optimal length of the rivet cell comprises identifying a length of the rivet cell that results in a lowest energy release rate.

9. The method of claim 1, wherein modeling the stress hotspot comprises:
generating a three-dimensional (3D) model of the structure;
executing an instruction to perform stress analysis on the 3D model; and
identifying the location of the stress hotspot from an output of the stress analysis.

10. A computer program product for determining a location of a rivet cell in a structure, the computer program product comprising a computer readable storage medium having program instructions embodied therewith, the program instructions executable by a processing element of a device to cause the device to:
model a location of a stress hotspot in a structure;
model a relationship between a length of a rivet cell and an energy release rate of the structure;
identify an optimal length of the rivet cell based on the modeled relationship;
generate rivet cell data that indicates an insertion location of the rivet cell, wherein the insertion location is based on the location of the stress hotspot; and
send the rivet cell data to a device to instruct the device to construct the structure in accordance with the rivet cell data, such that the structure is constructed to include the rivet cell at the insertion location, and such that the rivet cell extends through the stress hotspot of the structure, and threads through at least one dielectric region among a plurality of dielectric regions of the structure.

11. The computer program product of claim 10, wherein:
the model of the relationship is being performed based on a projection of an anomaly at the location of the stress hotspot and on an interface between a first dielectric region and a second dielectric region among the plurality of dielectric regions;
upon the insertion of the rivet cell, the rivet cell threads through at least a portion the first dielectric region and at least a portion of the second dielectric region; and
the energy release rate of the structure is based on the location of the projected anomaly.

12. The computer program product of claim 11, wherein the projected anomaly is a crack at the interface between the first dielectric region and the second dielectric region.

13. The computer program product of claim 11, wherein the first dielectric region and the second dielectric region has different values of dielectric constant.

14. The computer program product of claim 10, wherein the rivet cell is among a number of rivet cells inserted in the stress hotspot, and the number of rivet cells is based on a size of the stress hotspot.

15. The computer program product of claim 10, wherein the stress hotspot is among a plurality of stress hotspots across the structure, and each stress hotspot include a respective set of rivet cells.

16. The computer program product of claim 10, wherein the program instructions are further executable by the processing element of the device to cause the device to identify a length of the rivet cell that results in a lowest energy release rate to identify the optimal length of the rivet cell.

17. The computer program product of claim 10, wherein the program instructions are further executable by the processing element of the device to:
generate a three-dimensional (3D) model of the structure;
execute an instruction to perform stress analysis on the 3D model; and
identify the location of the stress hotspot from an output of the stress analysis.

* * * * *